FIG. 1

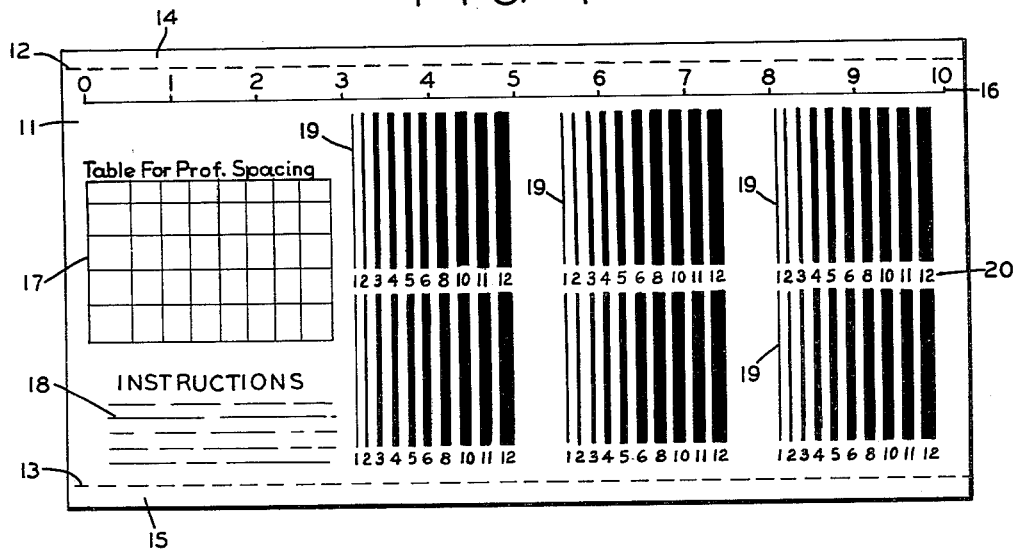

FIG. 2

TABLE FOR PROFESSIONAL SPACING

| POINT SIZE LETTERS | STRAIGHT SIDES | STRAIGHT AND ROUND | ROUND AND ROUND | ANGULAR AND ROUND | ANGULAR AND STRAIGHT | ANGULAR AND ANGULAR | OPPOSITE ANGLES |
|---|---|---|---|---|---|---|---|
| 96 PT. LETTERS | 10 PT. ME | 8 PT. MO | 8 PT. OO | 3 PT. AO | 8 PT. AN | 3 PT. AW | 8 PT. WY |
| 48 PT. LETTERS | 6 PT. MR | 4 PT. MQ | 3 PT. OC | 3 PT. AO | 6 PT. AH | 2 PT. AW | 6 PT. WY |
| 24 PT. LETTERS | 4 PT. MH | 3 PT. NC | 3 PT. OQ | 2 PT. AO | 3 PT. AN | 2 PT. AV | 4 PT. YW |
| 12 PT LETTERS | 3 PT. ME | 2 PT. MO | 2 PT. OO | 1 PT. AO | 2 PT. AM | 1 PT. AW | 2 PT. YW |

FIG. 3

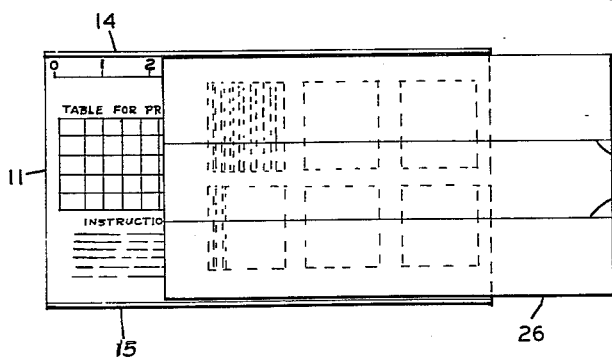

INVENTORS.
ELIZABETH A. BOND
HOWARD N. GOLD
JOHN S. MARRAN

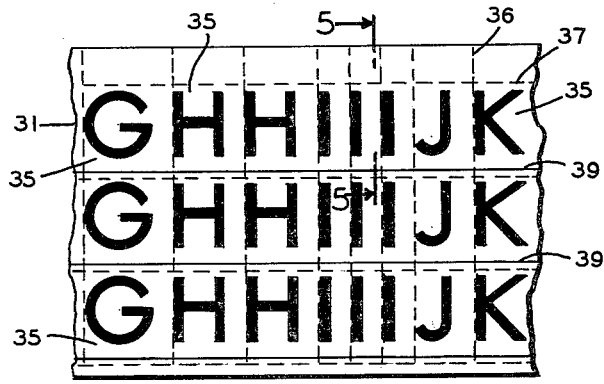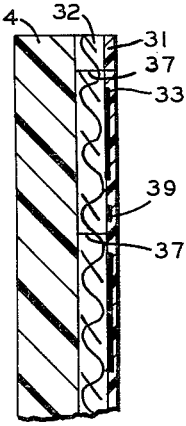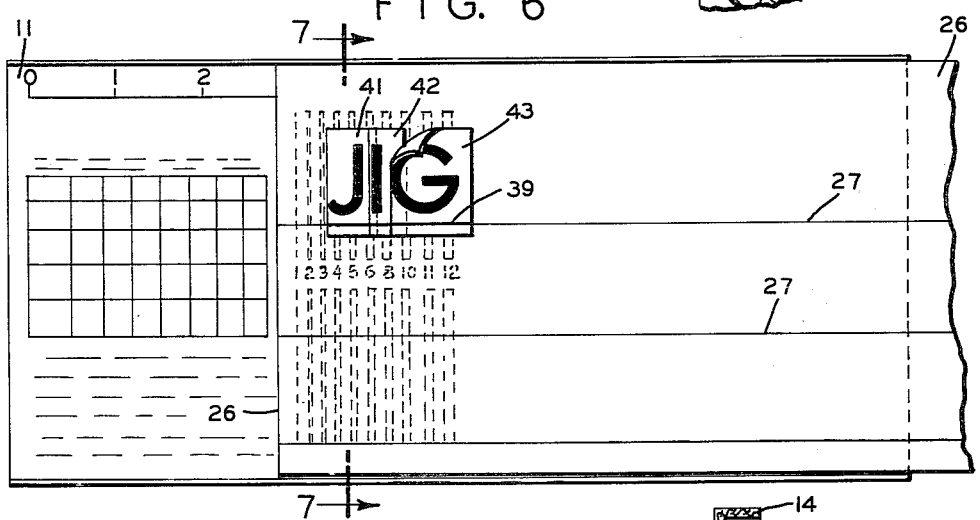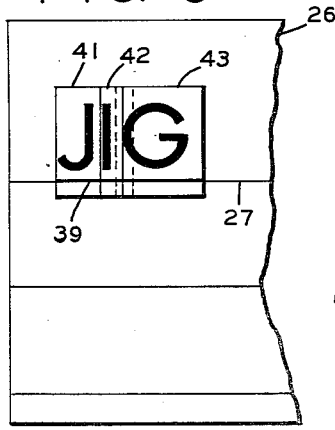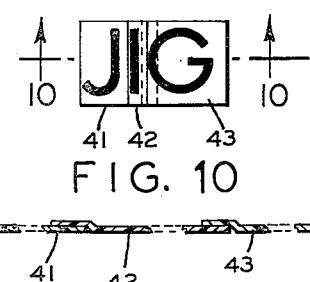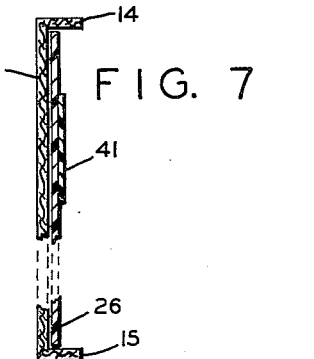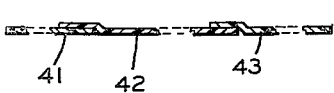
INVENTORS.
ELIZABETH A. BOND
HOWARD N. GOLD
JOHN S. MARRAN

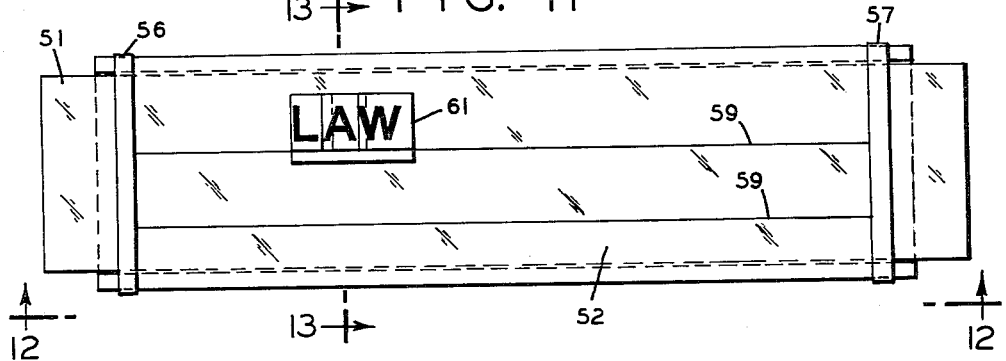
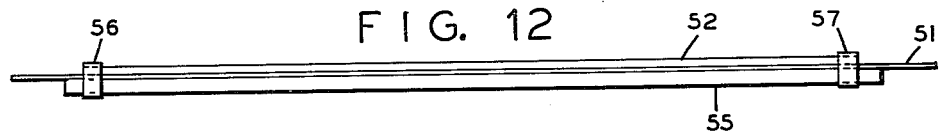
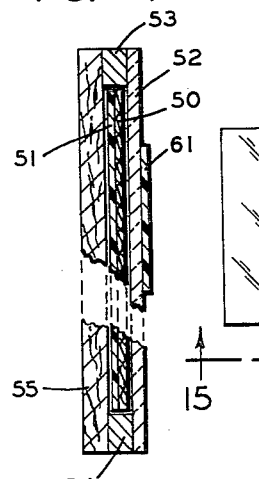
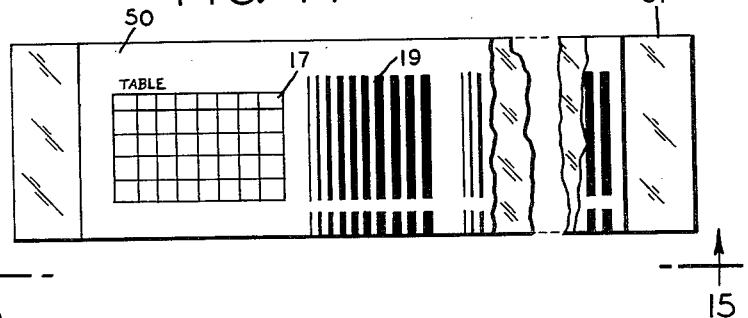
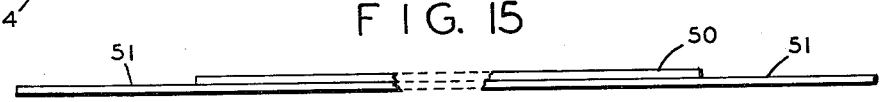

United States Patent Office 3,099,089
Patented July 30, 1963

3,099,089
TRANSPARENT SHEET PROVIDED WITH CHARACTERS AND INSTRUMENTALITIES FOR USING SUCH CHARACTERS
Elizabeth A. Bond, Easthampton, Howard N. Gold, Florence, and John S. Marran, Leeds, Mass., assignors to Chart-Pak, Incorporated, Leeds, Mass., a corporation of Connecticut
Filed June 16, 1961, Ser. No. 117,688
5 Claims. (Cl. 33—1)

This invention relates generally to composition of characters for reproduction and/or display purposes. More particularly the invention is concerned with a novel construction of characters applied on transparent sheets and concerns still further, instrumentalities for using such characters when providing compositions thereof.

For many years, the graphic arts industry has been supplied with flexible-base characters on adhesive sheets. Generally, a plurality of characters, such as an entire alphabet including numerals, is printed in ink upon the top or bottom surface of a thin, transparent sheet of acetate cellulose, and one of the surfaces is covered with a very thin layer of a flexible wax or other adhesive. When used, the desired letters are cut out of the sheet, applied to the artwork or layout, and burnished in place to cause the letters or characters to adhere. The wax layer becomes substantially invisible. Material of this type is shown and explained in great detail for instance in U.S. Patents Nos. 1,963,778, 2,308,900 and 2,970,043.

Yet, the use of these sheets known heretofore has not proven entirely satisfactory since an artist, and more often an unskilled person, is required to cut out individual characters from a single sheet and in doing so, may either remove too much or too little of the material surrounding the actual character and during subsequent trimming may damage adjacent characters or the selected character itself. Thus, this operation is wasteful and rarely does the user obtain complete usage of the sheet provided by the manufacturer. Moreover, the requirement of sharp tools and a straight edge to cut severance lines into the sheet for separating the selected character from surrounding material is time consuming and quite disconcerting, particularly to novices in the field.

In order to overcome these problems and to provide a more useful and commercially successful product, it has been found extremely helpful and advantageous to separate the individual characters printed on a sheet by score lines or die cuts and thus, eliminate the tedious, time consuming and frequently wasteful operation performed heretofore by the user. A sheet therefore, is divided into a plurality of separable units of predetermined size and shape, each unit containing a single character as for instance a letter, a numeral or a symbol.

Moreover, various attempts have been disclosed in the prior art to provide the individual characters with spacing marks or indicia for laterally spacing each character within a grouping in such a way as to obtain a pleasing optical appearance when the composition is viewed as a whole. Yet these relatively small marks or indicia have not proven satisfactory for two reasons. First, with relatively small spacing marks disposed necessarily outside the actual character area, the individual characters are positioned accurately only with difficulty and the manipulation thereof requires a certain degree of skill and experience. Secondly, these spacing marks, although related to the character with which they are associated, cannot take into account the configuration and form of the next succeeding character.

Investigations by the present inventors have shown that in order to achieve proper optical spacing and therefore, a most pleasing appearance, the amount of spacing between two consecutive characters is dependent quite clearly upon the form of the trailing edge of the first character with respect to the form of the leading edge of the succeeding second character. Thus character "A" which has an inclined trailing edge may be followed for instance by an "L" which has a straight leading edge, a "W" having an inclined leading edge, and "O" having a curved leading edge, etc. For achieving proper optical spacing, the amount of separation between the characters must be adjusted to suit these varying possibilities. By means of relatively simple and inexpensive instrumentalities disclosed hereafter, and using character units of the type indicated heretofore, such spacing can be obtained in a very easy and convenient manner. In this way a greatly improved result is obtained which constitutes a great simplification over the means and methods used heretofore in conjunction with similar adhesive character units.

One of the objects of this invention therefore is the provision of a new and novel flexible transparent sheet material provided with a plurality of individual characters, which sheet material overcomes many of the disadvantages and limitations of prior art devices.

Another object of this invention is to provide a flexible transparent sheet material which carries a plurality of characters and each character being readily separable from the sheet as a unit of predetermined size and shape.

A further object of this invention is to provide an aid for obtaining proper spacing of flexible-base characters when such characters are combined in a lateral grouping.

A still further object of this invention is the provision of a flexible transparent sheet readily separable into units, and of an instrumentality usable with such units to provide proper optical spacing between two consecutive characters in a grouping, whereby the separation between such characters is dependent upon the form of the characters.

Still another and further object of this invention is the provision of an instrumentality comprising a guide and a layout surface for use in conjunction with characters on transparent pressure sensitive sheet material, said guide and layout surface serving as an aid for providing proper optical spacing between characters when composing a lateral grouping thereof.

Other and further objects of this invention will be apparent by reference to the following description when taken in conjunction with the accompanying drawings in which:

FIGURE 1 is a plan view of a typical guide;
FIGURE 2 is an enlarged view of a printed table provided on the guide;
FIGURE 3 is a plan view of the guide when provided with a layout surface;
FIGURE 4 is a plan view of a typical transparent, pressure sensitive adhesive, sheet provided with character units used in conjunction with the guide and layout surface;
FIGURE 5 is a section along lines 5—5 in FIGURE 4;
FIGURE 6 is a plan view illustrating the use of the character units in conjunction with the guide and layout surface for generating properly spaced lateral groupings of characters;
FIGURE 7 is a view along lines 7—7 in FIGURE 6;
FIGURE 8 is an enlarged view of a finished grouping shown in FIGURE 6;
FIGURE 9 is a view of the same grouping after removing the horizontal spacing guide line;
FIGURE 10 is a sectional view taken along lines 10—10 in FIGURE 9;
FIGURE 11 is an alternative embodiment of the guide and layout surface combination;
FIGURE 12 is a side view of the alternative embodiment shown in FIGURE 11 as viewed along lines 12—12 in FIGURE 11;

FIGURE 13 is a sectional view of the alternative embodiment as viewed along lines 13—13 in FIGURE 11;

FIGURE 14 is a plan view of the guide used in FIGURE 11, and

FIGURE 15 is a side view of the guide as seen along lines 15—15 in FIGURE 14.

Referring now to the figures and FIGURE 1 in particular, a typical guide is shown which comprises essentially a flat, rectangular sheet of cardboard stock 11 which is imprinted with two longitudinal score lines 12 and 13 to provide two marginal borders 14 and 15 which can be folded upward along the respective score lines so that the guide takes the appearance of an open-ended tray as illustrated in FIGURE 3.

The guide is imprinted also with a measuring scale 16, a table of data 17, instructions 18 and several groups of parallel vertical lines 19, each line being spaced laterally from an adjacent line. The individual lines belonging to a group are of different width and in the example illustrated, the lines increase in width from left to right. Indicia 20 placed so that they can readily be read in conjunction with the associated lines, denote the thickness of the various lines, in the present embodiment 1 point thickness, 2 point thickness and so forth up to 12 point. The term "point" refers to the unit of measurement commonly employed in the graphic arts industry. It will be apparent however, that other units of measurement may be substituted.

FIGURE 2 shows an enlarged view of table 17 indicated in FIGURE 1. Investigations have shown that in order to obtain proper optical spacing between characters when viewing a pair or a grouping of characters as a whole, the spacing between individual characters must be varied with the size of the characters and should be a function of the form of the trailing edge of the first character with respect to the form of the leading edge of the succeeding or second character. For instance character M has a trailing edge of straight or vertical configuration and if this character is succeeded by an E which has a straight leading edge, the combination is straight—straight. Using 96 point letters, the spacing between such characters should be 10 point as stated in block 22 of the table. If in another combination an A is followed by an O the combination is angular—round as letter A has an inclined or angular trailing edge while character O has a round leading edge. Using 12 point letters, the recommended spacing is one point as shown by block 23. Similarly, the combination YW or WY, being opposite angles when considering leading and trailing character edges, should have a spacing of six points when using 48 point letter size as stated in block 24. The various other combinations are shown in FIGURE 2. Thus, for example in the word LAWYER, using 96 point letter characters, the recommended spacing between successive characters would be 8 point (L—A, straight—angular), 3 point (A—W), 8 point (W—Y), 8 point (W—E, angular—straight), 10 point (E—R, straight—straight). Although the example above describes capital letters, the same relationships hold true for lower case letters.

Table 17 therefore relates the characters used in conjunction with the guide to the vertical lines 19 and since varying spacing between characters is required depending upon the characters used, lines 19 are of different width so that any of the selected line thicknesses is available.

FIGURE 3 is a view of the assembled guide and superposed layout surface ready for use with transparent characters. Guide 11 with marginal borders 14 and 15 bent upward is fitted with a transparent layout surface 26, a smooth sheet of transparent plastic material, which is adapted to be slid laterally relative to the guide, the upstanding marginal borders serving to maintain vertical alignment between the guide and layout sheet. Surface 26 is provided also with two horizontal guide lines 27 and 28 for aligning therealong the individual characters. Obviously, one or more such horizontal guide lines could be provided on guide 11 which lines then would be visible through layout surface 26.

FIGURES 4 and 5 depict typical characters which are used with the foregoing instrumentality. A thin, flexible, transparent clear sheet of acetate cellulose is provided with characters of contrasting texture, such as letters, numerals, symbols, etc. The sheet contains a plurality of characters arranged in parallel horizontal rows, usually several of the identical characters in succession. The preparation of the character bearing sheet is well known in the art and only the main features are identified hereafter, namely the thin pressure sensitive adhesive layer 32 and printed characters 33. The sheet is provided also with a relatively stiff backing sheet 34 to protect the adhesive coating until the characters are used. In order to permit ready release of the character bearing sheet, or portions thereof, from the backing sheet, the latter preferably is made from material which has only slight adhesion with the adhesive layer 32. Typical of such material is silicone coated paper stock or papers known in the trade as release papers.

The transparent sheet however is provided with several innovations in order to render it more useful for the present purpose. The entire sheet is divided into a plurality of character bearing units 35, each unit having a single character which is of smaller dimensions than the unit itself so that each character is surrounded by a clear, transparent area. The boundaries of each unit are defined by horizontal and vertical score lines in the sheet, numerals 36 and 37, which score lines are of such width and depth in the acetate sheet 31 that the character bearing units can readily and easily be removed from the sheet and from adjacent characters without requiring the user to scribe lines and employ fancy manipulation. In this manner, each unit is of a predetermined size and shape. One convenient method of achieving the boundaries or severance lines is by die cutting the acetate sheet when the sheet is prepared. An important feature concerns the arrangement as clearly seen in FIGURE 4 wherein the leading edge of the actual character body is located very close to the boundary of the unit whereas the trailing edge is further removed from the boundary line at the trailing edge, thus leaving a certain amount of clear and transparent area. The purpose of this arrangement will be apparent in later figures.

In order to provide optimum utilization of a sheet, the severance line at the trailing edge of one character unit forms also the severance line at the leading edge of a succeeding unit.

Additionally each character unit is provided with a thin horizontal guide line 39 which runs laterally along the sheet and serves for aligning the characters vertically. Obviously, this line is equi-spaced from the characters on a sheet. Although an shown, this guide line is disposed underneath the characters, it could be placed thereabove.

The use of the entire arrangement will be apparent from the description hereafter. In FIGURE 6 guide 11 is provided with the layout surface 26. Unit 41, bearing character J, has been separated from sheet 31 and placed upon layout surface 26 so that horizontal guide line 39 underneath the letter coincides with line 27. The lateral position of letter J on surface 26 is of no import since this letter is the first letter in the lateral grouping. Attention must be paid however, that there is sufficient space toward the right for other and succeeding characters. The character bearing unit adheres to the layout surface after application of light pressure. The next unit, bearing character I, also has been separated from the respective sheet and affixed to the layout surface such that its horizontal guide line again coincides with line 27, thereby assuring vertical alignment of the two characters. The leading portion of character unit I overlaps with the trailing portion of character unit 41 and in order to provide this overlapping condition, all character bearing units 35 are arranged to have a clear and transparent portion adjacent to the trailing edge of each character body as described previously. The positioning of letter G will now be described in detail.

Assuming that 96 point lettering is used, table 17 in FIGURE 2 reveals a recommended character spacing of 8 point for the condition of "straight" (letter I) adjacent to "round" (letter G). Therefore, the layout surface is shifted laterally until the trailing edge of letter I coincides with the left or leading edge of the vertical line denoted "8," indicating 8 points. The width of the line, visible through the transparent layout surface, indicates now the surface, indicates now the desired letter separation. Next, letter unit G, numeral 43 is affixed to the layout surface such that the leading edge of the body of character "G" coincides with the right or trailing edge of the line denoted "8." Again vertical spacing is accomplished as described heretofore. The two characters therefore are spaced from another by a width equal to the thickness of the selected vertical line.

For a next character, the layout surface is shifted laterally until the selected vertical line width appears adjacent to the trailing edge of the character. In order to keep the amount of lateral shifting to a minimum, several groups of vertical lines are provided on the guide, although quite obviously a single group would suffice.

When expanded or condensed lettering is desired, the recommended spacing values shown on the table are either augmented or decreased by a constant value of points, for instance by respectively adding a value of two or subtracting a value of one point.

FIGURE 7 is a sectional view along lines 7—7 in FIGURE 6 and shows the position of the guide, layout surface and characters affixed thereupon.

FIGURE 8 shows the layout surface with characters removed from the guide by being lifted off. The grouping of characters, properly spaced for optical appearance and one character adhering to the other, is now ready for use. By means of a sharp or pointed instrument, a small bottom portion of the individual units is removed by one straight cut (FIGURE 9) so that the horizontal spacing guide line is removed as this line is no longer needed, all characters being properly aligned in vertical direction and are remaining in this condition by virtue of the characters adhering to one another. Next, the grouping is removed from the layout surface by starting at the left end of the grouping and slowly lifting off the characters. As a next step, the grouping is affixed to the final surface and burnished in place using an instrument or pressing with the thumbnail while moving along the grouping of characters.

FIGURE 10 shows in a greatly enlarged scale the partial overlapping of the individual character units. This overlapping condition retains the characters one to the other and is well understood from the prior art.

FIGURES 11 through 15 show an alternative embodiment of the guide and layout surface. The entire mechanism is more rigid and somewhat heavier. Guide 50, FIGURE 14, provided with table 17 and group of horizontal spacing lines 19 is mounted upon a longer support sheet or strip 51, FIGURE 15. In one typical embodiment, the support sheet is a strip of acetate material.

There is provided an open-ended rectangular frame, FIGURE 13, comprising a top transparent glass plate 52, longitudinal spacing strips 53 and 54 and a backing plate 55. Banding strips 56 and 57 at either end hold the frame structure together. Guide 50 with support sheet 51 is inserted into the frame one end and is adapted to move laterally in the frame relative to top glass plate 52 upon pulling either end of sheet 51, the latter being dimensioned to protrude from the frame. The underside of glass plate 52 is provided with a set of horizontal guide lines 59 for aligning the characters thereupon, such as characters 61. Quite apparently, the guide lines may be provided on the guide sheet 50.

In the embodiment described hereinabove, the stationary glass plate constitutes the layout surface and the guide 50 is slid along in the frame until a selected vertical line visible through the layout plate is disposed adjacent to the character affixed to the glass surface. In every other respect the procedure of aligning and spacing characters is identical with the procedure and method described heretofore. The glass plate is somewhat more durable and rigid and therefore constitutes an ideal layout surface. Also the characters can readily be lifted off the surface.

In a general sense, the arrangement in FIGURES 11 and 12 is the reverse of the embodiment shown in FIGURES 3 and 7. In the latter embodiment the guide with vertical spacing lines is stationary and the layout surface is movable relative thereto, while in the former arrangement, the guide is movable laterally relative to a stationary layout surface.

It will be apparent that the above described method and several parts form a combination which greatly facilitates the composing of groups of characters using individual, pressure sensitive characters severed from transparent sheets. The method of obtaining properly spaced characters is extremely simple, readily understood and requires little or no skill and experience. The final appearance of the composition is indistinguishable from that of a typeset one. The scoring of the adhesive character bearing sheet simplifies the removal of characters therefrom and constitutes a great saving in time as far as the final user is concerned.

While there have been described and illustrated certain embodiments of the present invention, it will be apparent to those skilled in the art that various modifications and changes may be made therein without deviating from the principle and intent of the present invention which shall be limited only by the scope of the appended claims.

What is claimed is:

1. A method of providing a lateral grouping of spaced characters using individual characters imprinted on units of transparent, relatively thin and flexible sheet material which material is provided with a pressure sensitive adhesive backing to cause each such unit to adhere to a layout surface by application of pressure, said method comprising the steps of affixing a first unit provided with a character to a substantially transparent layout surface which is positioned above a guide having at least one vertical line adapted to be used for spacing purposes; positioning said layout surface relative to said vertical line such that said line becomes disposed at the trailing edge of said character, and affixing a second character unit to said layout surface in such a position that the leading edge of the second character is separated from the trailing edge of the first character substantially by the width of said line.

2. A method of providing a lateral grouping of spaced characters using individual characters imprinted on units of transparent, relatively thin and flexible sheet material which material is provided with a pressure sensitive adhesive backing to cause each such unit to adhere to a layout surface by application of pressure and each said unit being of a larger area than the area occupied by the respective character, said method comprising the steps of affixing a first unit provided with a character to a substantially transparent layout surface which is positioned above a guide having at least one vertical line adapted to be used for spacing purposes; positioning said layout surface relative to said vertical line such that said line becomes disposed at the trailing edge of said character, with a portion of the transparent material of the unit extending laterally beyond the width of said line, and affixing a second character unit to said layout surface in such a position that the leading edge of the second character is separated from the trailing edge of the first character substantially by the width of said line and the leading portion of the second unit adheres in overlapping relationship to the trailing portion of the first unit.

3. A method of providing a lateral grouping of spaced characters using individual characters imprinted on units of transparent, relatively thin and flexible sheet material which material is provided with a pressure sensitive adhesive backing to cause each such unit to adhere to a layout surface by application of pressure and each said unit being of a larger area than the area occupied by the respective character, said method comprising the steps of affixing a first unit provided with a character to a substantially transparent layout surface which is positioned above a guide having a plurality of vertical lines adapted to be used for spacing purposes and said lines being of different width; positioning said layout surface relative to a selected vertical line such that said selected line becomes disposed at the trailing edge of said first character, with a portion of the transparent material of the unit extending laterally beyond the width of said line; affixing a second character unit to said layout surface in such a position that the leading edge of the second character is separated from the trailing edge of the first character substantially by the width of said selected line and the leading portion of the second unit adheres in overlapping relationship to the trailing portion of the first unit; positioning said layout surface relative to a further selected vertical line such that the last selected line becomes disposed at the trailing edge of said second character, with a portion of the transparent material of the second character extending laterally beyond the width of said last selected line; affixing a third character unit to said layout surface in such a position that the leading edge of the third character is separated from the trailing edge of the second character substantially by the width of said last selected line and the leading portion of the third character unit adheres in overlapping relationship to the trailing portion of the second unit, and repeating the steps between the second and third character for successive characters in the grouping.

4. An instrumentality for aiding in providing groupings of spaced characters using individual characters imprinted on transparent, relatively thin and flexible sheet material which is provided with an adhesive backing to cause each character to adhere to a layout surface by application of pressure; said instrumentality including a guide and a flat layout surface; said guide comprising a substantially flat base surface and two upstanding marginal strips along the respective horizontal sides to define a U-shaped cross section; said base surface being provided with a plurality of parallel vertical lines, spaced laterally from one another and said lines being of different width; said layout surface comprising transparent material positionable on said base surface; said guide and layout surface when in superposed relationship being movable laterally relative to one another with the upstanding strips forming guides for said layout surface and restricting motion of said layout surface relative said base surface along the major axis of said vertical lines, whereby to enable a character affixed to said layout surface to be shifted laterally relative to said lines so as to facilitate positioning of a portion of said transparent material adjacent to one of the selected vertical lines.

5. An instrumentality as set forth in claim 4 wherein said layout surface is provided with a line which extends substantially parallel to the axis of motion of said layout surface relative to the base surface.

References Cited in the file of this patent

UNITED STATES PATENTS

| | | |
|---|---|---|
| 972,528 | Halloran | Oct. 11, 1910 |
| 1,205,401 | Smith et al. | Nov. 21, 1916 |
| 1,372,174 | Lichter | Mar. 22, 1921 |
| 1,777,144 | Innes | Sept. 30, 1930 |
| 2,140,914 | Kothny | Dec. 20, 1938 |
| 2,250,583 | Krauter | July 29, 1941 |
| 2,372,994 | Welch | Apr. 3, 1945 |
| 2,465,927 | Rapp | Mar. 29, 1949 |
| 2,539,609 | Buckingham | Jan. 30, 1951 |
| 2,970,043 | Serafin | Jan. 31, 1961 |